(12) United States Patent
Mettath

(10) Patent No.: US 9,926,484 B2
(45) Date of Patent: Mar. 27, 2018

(54) WELLBORE STRENGTHENING COMPOSITION

(75) Inventor: Sashikumar Mettath, Houston, TX (US)

(73) Assignee: M-I L.L.C., Houston, TX (US)

( * ) Notice: Subject to any disclaimer, the term of this patent is extended or adjusted under 35 U.S.C. 154(b) by 343 days.

(21) Appl. No.: 13/982,201

(22) PCT Filed: Jan. 26, 2012

(86) PCT No.: PCT/US2012/022728
§ 371 (c)(1),
(2), (4) Date: Jan. 15, 2014

(87) PCT Pub. No.: WO2012/103338
PCT Pub. Date: Aug. 2, 2012

(65) Prior Publication Data
US 2014/0290954 A1  Oct. 2, 2014

Related U.S. Application Data

(60) Provisional application No. 61/436,339, filed on Jan. 26, 2011.

(51) Int. Cl.
*C09K 8/24* (2006.01)
*C09K 8/60* (2006.01)
(Continued)

(52) U.S. Cl.
CPC ............ *C09K 8/50* (2013.01); *C08L 63/10* (2013.01); *C09K 8/035* (2013.01); *C09K 8/5755* (2013.01); *E21B 43/00* (2013.01); *C09K 2208/00* (2013.01)

(58) Field of Classification Search
CPC ........ C09K 8/24; C09K 8/508; C09K 8/5083; C09K 8/5086; C09K 8/5751;
(Continued)

(56) References Cited

U.S. PATENT DOCUMENTS 4,375,489 A   3/1983  Muszynski
5,373,003 A *  12/1994  Lowe, III ............. C07D 471/08
                                                       514/216

(Continued)

FOREIGN PATENT DOCUMENTS

CN  1200785 A  12/1998
CN  1693402 A  11/2005
(Continued)

OTHER PUBLICATIONS

Decision of Rejection for the equivalent Chinese patent application 201280009657.3 dated Jan. 11, 2017.
(Continued)

*Primary Examiner* — Aiqun Li
(74) *Attorney, Agent, or Firm* — Osha Liang LLP

(57) ABSTRACT

In one aspect, embodiments disclosed herein relate to a wellbore strengthening composition including at least one polymer capable of polymerizing through a free radical polymerization reaction from the group of epoxy acrylates, modified epoxy acrylates, epoxy precursors, modified epoxy vinyl esters, unsaturated polyesters, urethane (meth)acrylates, polyester acrylates, epoxy vinyl ester resins having the formula (I), wherein R and $R^1$-$R^5$ may be $CH_3$— or H and $R^6$-$R^{21}$ may be H or Br, and polymer combinations thereof; and at least one initiator, wherein the resin is present in the amount from about 10 to about 90 weight percent.

(Continued)

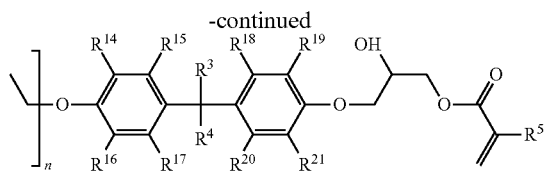

9 Claims, 3 Drawing Sheets

(51) Int. Cl.
  *C09K 8/50* (2006.01)
  *C09K 8/575* (2006.01)
  *C08L 63/10* (2006.01)
  *C09K 8/035* (2006.01)
  *E21B 43/00* (2006.01)

(58) Field of Classification Search
  CPC ...... C09K 8/5753; C09K 8/5755; C09K 8/88; C09K 8/882; C09K 8/885
  USPC .............................. 507/117, 219; 166/305.1
  See application file for complete search history.

(56) References Cited

U.S. PATENT DOCUMENTS

| | | | |
|---|---|---|---|
| 5,875,844 A | 3/1999 | Chatterji et al. | |
| 6,034,155 A | 3/2000 | Espeland et al. | |
| 6,565,285 B1 | 5/2003 | Landrichter | |
| 7,696,133 B2 | 4/2010 | Cowan | |
| 2007/0021309 A1 | 1/2007 | Bicerano | |
| 2007/0181302 A1 | 8/2007 | Bicerano | |
| 2007/0227733 A1 | 10/2007 | Vercaemer et al. | |
| 2009/0250218 A1 | 10/2009 | Akarsu et al. | |
| 2010/0036013 A1* | 2/2010 | Roelle | C07C 323/36 522/174 |
| 2011/0039737 A1 | 2/2011 | Schmidt et al. | |
| 2011/0073327 A1* | 3/2011 | Buergel | C04B 26/04 166/382 |

FOREIGN PATENT DOCUMENTS

| | | |
|---|---|---|
| CN | 102030498 A | 4/2011 |
| DE | 102008011413 A1 | 9/2009 |
| EP | 1751197 B1 | 11/2009 |
| WO | 9715746 A1 | 5/1997 |
| WO | 2006/009308 A1 | 1/2006 |
| WO | 2006009308 A1 | 1/2006 |
| WO | 2011042826 A2 | 4/2011 |
| WO | 2012015860 A1 | 2/2012 |

OTHER PUBLICATIONS

International Search Report and Written Opinion issued in PCT/US2012/045920 dated Mar. 26, 2013, 15 pages
ThermaSet (2010), wellcem.com.no, Retrieved from http://www.wellcem.no/page/ThermaSet%C2%AE_id17.html.
ThermaSet, MSDS No. 1907/2006/EC, Article 31, WellCem AS, Trondheim, Norway, Aug. 26, 2009.
International Search Report for PCT Application Serial No. PCT/US2012/022728 dated Apr. 13, 2012.
Han, et al., "Development and application of vinyl ester of versatic acid", Adhesion, vol. 8, Dec. 31, 2010, pp. 67-69.
Written Opinion issued in PCT/US2012/022728 dated Jul. 30, 2013, 10 pages.
Examination Report issued in AU 2012211255 dated Mar. 25, 2014, 3 pages.
Examination Report issued in CA 2,825,796 dated Feb. 2, 2015, 5 pages.
First Office Action issued in CN 201280009657.3 dated Feb. 2, 2015, 20 pages.
Official Action issued in EA 201391082 dated Apr. 28, 2015, 5 pages.
EPC Article 94(3) issued in EP12702943.7 dated Oct. 8, 2014, 4 pages.
EPC Article 94(3) issued in EP12702943.7 dated Sep. 16, 2014, 4 pages.
Office Action issued in Eurasian Application No. 201391082; Dated Apr. 19, 2016 (5 pages).
Office Action issued in European Application No. 12702943.7; Dated Jun. 2, 2016 (4 pages).
Office Action issued in Canadian Application No. 2,825,796; Dated Sep. 26, 2016 (3 pages).

* cited by examiner

WELLBORE STRENGTHENING COMPOSITION

RELATED APPLICATIONS

This application claims the benefit of a related U.S. Provisional Application Ser. No. 61/436,339 filed Jan. 26, 2011, the disclosure of which is incorporated by reference herein in its entirety.

BACKGROUND

Oilfield drilling typically occurs in geological formations having various compositions, permeabilities, porosities, pore fluids, and internal pressures. Weak zones may occur during drilling due to these formations having a variety of conditions. These weak zones may lead to fluid loss, pressure changes, well cave-ins, etc. The formation of weak zones is detrimental to drilling because they need to be strengthened before drilling work may resume.

Weak zones may occur, for example, when the fracture initiation pressure of one formation is lower than the internal pore pressure of another formation. As another example, increased borehole pressure, created by penetrating one formation, may cause a lower strength formation to fracture. As another example, the fluid pressure gradient in a borehole required to contain formation pore pressure during drilling may exceed the fracture pressure of a weaker formation exposed in a borehole.

Typically, weak zones have been strengthened by pumping a fluid into the weak zone, letting the fluid cure and develop strength over a period of time. Fluids used in the past include cement, epoxy resins with amine initiators and vinyl toluenes with initiators. The cure time for cement may be as long as 24 hours, delaying oil production which is undesirable, especially for off-shore drilling with high operating costs. Cement's particle based structure may also exhibit poor penetration capabilities in the formation leading to a reduced sealing effect. When using epoxy resins or vinyl toluenes, the cure time may be reduced, but the compositions are toxic, highly corrosive, flammable and pose a health hazard.

Cement, or other fluid compositions used for strengthening weak zones, may also be used in primary cementing operations which fill at least a portion of the annular space between the casing and the formation wall with the fluid. The cement may then be allowed to solidify in the annular space, thereby forming an annular sheath of cement. The cement barrier is desirably impermeable, such that it will prevent the migration of fluid between zones or formations previously penetrated by the wellbore.

Typically, the cement or strengthening composition is mixed at the surface and pumped downhole at high pressure to fill in the weak zone. Once the composition fills in the weak zones, it is allowed to set or cure, harden within the well bore.

Accordingly, there exists a need to reduce the amount of time required for curing along with making a safe composition.

SUMMARY

In one aspect, embodiments disclosed herein relate to a wellbore strengthening composition including at least one polymer capable of polymerizing through a free radical polymerization reaction from the group of epoxy acrylates, modified epoxy acrylates, epoxy precursors, modified epoxy vinyl esters, unsaturated polyesters, urethane(meth)acrylates, polyester acrylates, epoxy vinyl ester resins having the formula:

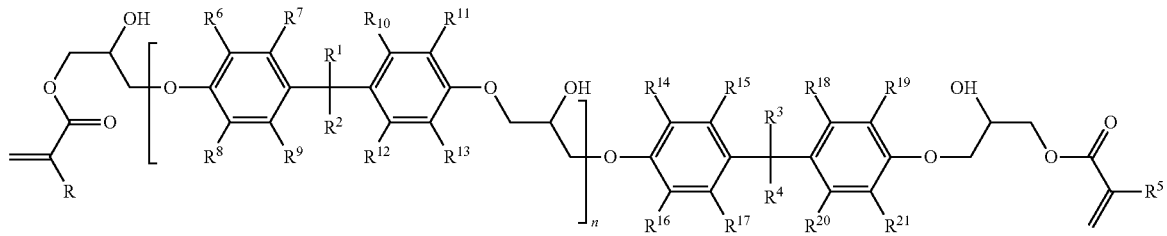

wherein R and $R^1$-$R^5$ may be $CH_3$— or H and $R^6$-$R^{21}$ may be H or Br, and polymer combinations thereof; and at least one initiator, wherein the resin is present in the amount from about 10 to about 90 weight percent.

In another aspect, embodiments disclosed herein relate to a method of treating an earth formation including introducing at least one polymer in a liquid phase into the earthen formation; introducing at least one initiator into the earthen formation; and contacting the polymer and the initiator to form a composite; wherein the polymer comprises at least one polymer capable of polymerizing through a free radical polymerization reaction from the group of epoxy acrylates, modified epoxy acrylates, epoxy precursors, modified epoxy vinyl esters, unsaturated polyesters, urethane(meth)acrylates, polyester acrylates, epoxy vinyl ester resins having the formula:

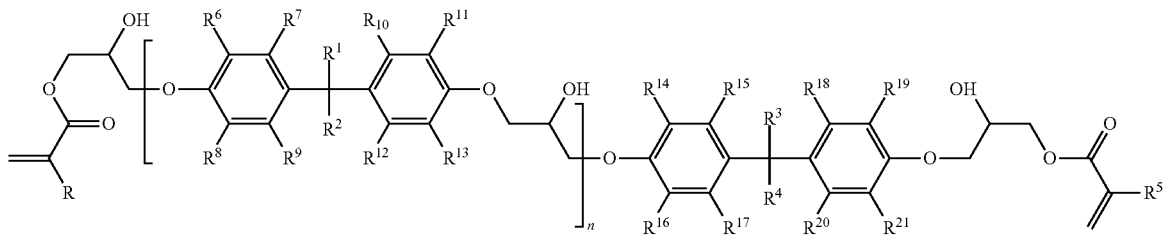

wherein R and $R^1$-$R^5$ may be $CH_3$— or H and $R^6$-$R^{21}$ may be H or Br, and polymer combinations thereof.

In another aspect, embodiments disclosed herein relate to a method for sealing a subterranean well comprising: pumping at least one polymer in a liquid phase into at least a portion of an annular space between the sidewalls of a wellbore and the exterior of a casing string disposed in the wellbore, pumping at least one initiator into at least a portion of the annular space; and allowing the at least one polymer and the at least one initiator to solidify into a composite therein, wherein the at least one polymer comprises at least one polymer capable of polymerizing through a free radical polymerization reaction from the group of epoxy acrylates, modified epoxy acrylates, epoxy precursors, modified epoxy vinyl esters, unsaturated polyesters, urethane(meth)acrylates, polyester acrylates, epoxy vinyl ester resins having the formula:

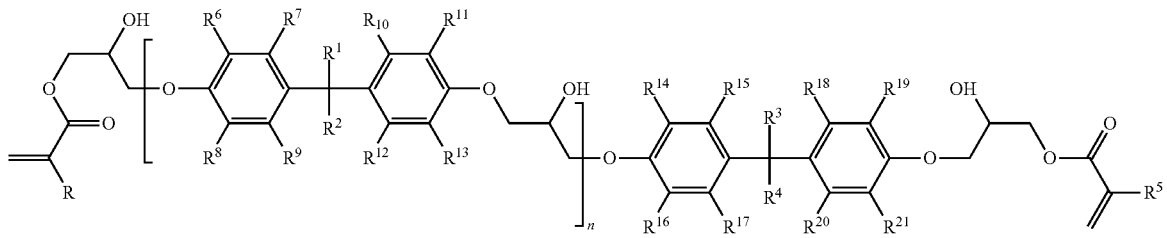

wherein R and $R^1$-$R^5$ may be $CH_3$— or H and $R^6$-$R^{21}$ may be H or Br, and polymer combinations thereof.

DETAILED DESCRIPTION

Figure 1:
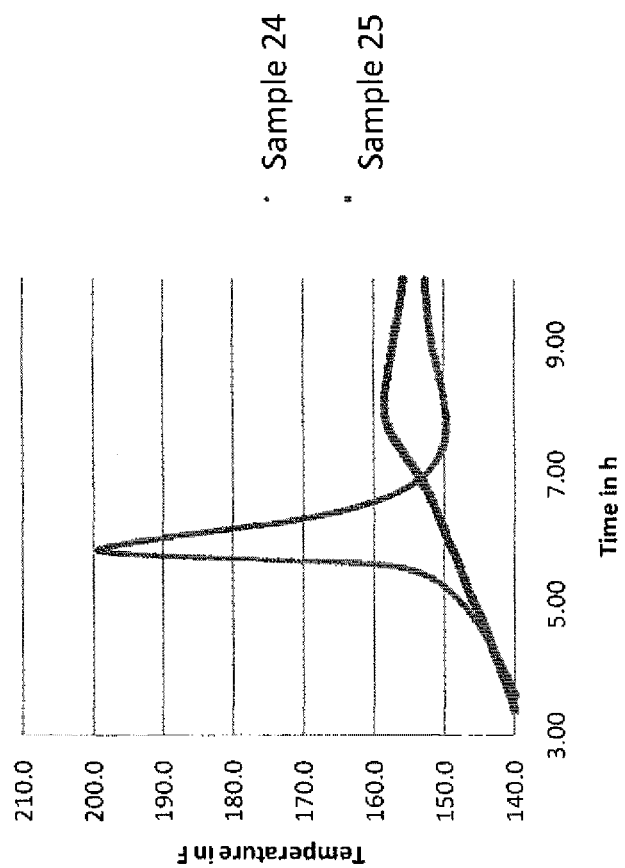
FIG. 1 graphically compares curing temperatures and curing times for wellbore strengthening compositions according to embodiments disclosed herein.

Embodiments disclosed herein relate to the use of wellbore strengthening compositions in downhole applications. Other embodiments of the disclosure relate to methods for producing wellbore strengthening compositions. In the following description, numerous details are set forth to provide an understanding of the present disclosure. However, it will be understood by those skilled in the art that the present invention may be practiced without these details and that numerous variations or modifications from the described embodiments may be possible.

In one aspect, embodiments disclosed herein relate to a process for treating an earthen formation. The process may include: introducing a mixture of a polymer and an initiator into the earthen formation, and contacting the polymer and the initiator to form a composite. In other aspects, embodiments disclosed herein relate to methods of making such composites, and applications in which the composites disclosed herein may be useful.

Composite

The composites of the present disclosure may be used in downhole applications as a component of drilling mud or they may be preformed and pumped downhole without drilling mud. Alternatively, the components may be introduced simultaneously or sequentially downhole forming the composite in situ. For example, the liquid components may be pumped into a wellbore which traverses a loosely consolidated formation, and allowed to cure, thereby forming a polymeric network which stabilizes the formation and the wellbore as a whole.

In some embodiments, the composites are formed from a variety of resins which are polymerized to form the composite structure. Further, accelerators or retardants may optionally be added to effect or enhance composite formation. Also, additives such as stabilizers, plasticizers, adhesion promoters, and fillers may be added to enhance or tailor the composite properties.

Curable Polymers

Curable polymers (or pre-polymers) may be cured or cross-linked to a higher molecular weight bulk material, such as the composite of the present disclosure, which may have desirable mechanical and chemical properties. Such properties may include hardness, durability, and resistance to chemicals.

In some embodiments, a curable polymer may include an epoxy vinyl ester resin of the following formula:

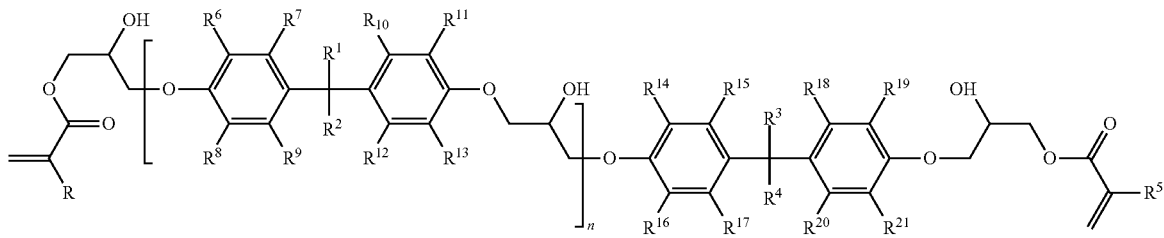

wherein R and $R^1$-$R^5$ may be $CH_3$— or H and $R^6$-$R^{21}$ may be H or Br. In other embodiments, the reactive polymer may be a vinyl ester polymer formed from the esterification of an epoxy resin with an unsaturated carboxylic acid, modified epoxy acrylates, modified epoxy vinyl esters, unsaturated polyesters, or combinations thereof. The epoxy resin may be formed from bisphenol a type, bisphenol f type, novolac, and aliphatic epoxies. Related derivatives may also be used as long as they are polymerizable through a free radical polymerization reaction. As used herein, modified means hybrid polymers or polymers that are extended with other molecules that are not bisphenol derivatives.

Depending on the particular application, it may be desirable to form a composite to treat weak or permeable formations. Liquid polymer solutions are particularly well suited for downhole applications because they are pumpable in their uncured state. In various embodiments, the liquid polymer solutions may be used in its neat form, may be dissolved in a solvent, or may be dispersed or emulsified in a non-miscible phase, and a curing agent may be added to the liquid solution to form a composite.

For example, such a liquid polymer solution may be pumped downhole to traverse a loosely consolidated formation in the wellbore. An initiator and desired additives may then be pumped downhole to initiate curing of the liquid polymer solution to form a strongly bonded matrix that may efficiently coat the loosely consolidated formation. The inventors of the present disclosure have discovered that such a strongly bonded matrix may effectively retain the loosely consolidated formation, therefore controlling the production of sand grains from the treated zones. This treatment may serve to strengthen the wellbore and reduce debris which may cause wear to downhole tools.

The curable polymer may be used in an amount ranging from about 10 to about 90 weight percent, based on the total weight of the composite, from about 20 to about 80 weight percent in other embodiments, and from about 30 to about 70 weight percent in yet other embodiments.

In some embodiments, the curable polymer may be a combination of a first polymer of at least one epoxy vinyl ester resin having the formula described above and a second polymer of at least one polymer capable of polymerizing through a free radical polymerization reaction from the group of epoxy acrylates, modified epoxy acrylates, epoxy precursors, modified epoxy vinyl esters, unsaturated polyesters, urethane acrylates, urethane (meth)acrylates, polyester acrylates or combinations thereof.

In some embodiments, an epoxy vinyl ester may be used in combination with a urethane acrylate resin of the following formula:

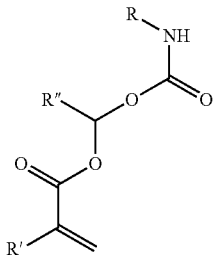

wherein R may be an aliphatic or aromatic group, such as a C6-C28 aliphatic or aromatic group and in which additional functionalization and/or substitution may be included and wherein R' or R" may be hydrogen or methyl. The urethane acrylate may be derived from hydroxyl functional (meth) acrylate and an isocyanate. Advantageously, embodiments using a combination of the first and second polymers (such as the vinyl ester and urethane acrylate in a particular embodiment) may allow for a low exothermic reaction, which may be defined as a release of only 10 to 40 degrees F. during the polymerization.

The first polymer may be used in an amount ranging from about 0 to about 100 weight percent, based on the total weight of the curable polymer, from about 10 to about 90 weight percent in other embodiments, and from about 20 to about 80 weight percent in yet other embodiments. The second polymer may be used in an amount ranging from about 0 to about 100 weight percent, based on the total weight of the curable polymer, from about 10 to about 90 weight percent in other embodiments, and from about 20 to about 80 weight percent in yet other embodiments.

Diluent

The polymer may be combined with a reactive diluent. The reactive diluent may be a monomer or blend of monomers that are polymerizable by free-radicals. Examples of such monomoers include the following: vinyl monomers such as styrene derivatives (styrene, vinyl toluene, alpha methyl styrene, divinyl benzene, tertiary butyl styrene, diallyl phthalate, isocyanurate and others); acrylates and methacrylates (monofuntional, multifunctional, hydroxyl functionalized, amine functionalized, carboxylic acid functional, polyether polyol extended, all esters of acrylic acid or methacylic acid, and others); vinyl ester monomers (esters of versatic acid such as VeoVa~ 10 by Hexion Specialty Chemicals, Columbus, Ohio); and combinations thereof, as well as all related derivatives that are cross-linkable through a free radical polymerization reaction.

Some examples of acrylates and methacrylates include: hydroxyethyl methacrylate (HEMA), hydroxypropyl methacrylate (HAMA), acrylic acid, methacrylic acid, methyl acrylate, ethyl acrylate, propyl acrylate, butyl acrylate, isodecyl acrylate, stearyl acrylate, lauryl acrylate, tridecyl acrylate, isooctyl acrylate, ethyoxylated bispheonl A diacrylate, ethoxylated hydroxyethyl acrylate, allyl acrylate, glycidyl methacrylate, 1,4-butanediol diacrylate (BDDA), 1,6-hexanediol diacrylate (HDDA), diethylene glycol diacrylate, 1,3-butylene glycol diacrylate, neopentyl glycol diacrylate, cyclohexane dimethanol diacrylate, dipropylene glycol diacrylate, ethoxylated bisphenol A diacrylate, trimethylolpropane triacrylate, pentaerythritol triacrylate, pentaerythritol tetraacrylate, polyethylene glycol diacrylate, polypropylene glycol diacrylate, 4-acryloylmorpholine, metal chelated derivates of acrylates, and all related derivatives and all methacrylate and acrylate derivatives thereof.

The reactive diluent may be used in an amount ranging from about 10 to about 90 weight percent, based on the total weight of the composite, from about 20 to about 80 weight percent in other embodiments, and from about 30 to about 70 weight percent in yet other embodiments.

Initiator

In one embodiment, the polymers and/or monomers are contacted with at least one initiator in order to effect the formation of the composite. In general, the initiator may be any nucleophilic or electrophilic group that may react with the reactive groups available in the polymers and/or monomers. In a further embodiment, the initiator may comprise a polyfunctional molecule with more than one reactive group. Such reactive groups may include for example, amines, alcohols, phenols, thiols, carbanions, organofunctional silanes, and carboxylates.

Examples of initiators include free radical initiating catalysts, azo compounds, alkyl or acyl peroxides or hydroperoxides, dialkyl peroxides, ketoperoxides, peroxy esters, peroxy carbonates, peroxy ketals, and combinations thereof. Examples of free radical initiating catalysts include benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di(2,4-dichlorobenzoyl)peroxide, diisobutyl peroxide, t-butyl perbenzoate, t-butyl peracetate, and combinations thereof.

In some embodiments, the initiators may be peroxide based and/or persulfates. The amount of initiators is preferably from about 0.1 wt % to about 3 wt %, more preferably from about 0.7 wt % to about 1 wt %, most preferably from about 0.3 wt % to about 0.5 wt %.

Accelerators and Retardants

Accelerators and retardants may optionally be used to control the cure time of the composite. For example, an accelerator may be used to shorten the cure time while a retardant may be used to prolong the cure time. In some embodiments, the accelerator may include an amine, a sulfonamide, or a disulfide, and the retardant may include a stearate, an organic carbamate and salts thereof, a lactone, or a stearic acid.

Additives

Additives are widely used in polymeric composites to tailor the physical properties of the resultant composite. In some embodiments, additives may include plasticizers, thermal and light stabilizers, flame-retardants, fillers, adhesion promoters, or rheological additives.

Addition of plasticizers may reduce the modulus of the polymer at the use temperature by lowering its glass transition temperature (Tg). This may allow control of the viscosity and mechanical properties of the composite. In some embodiments, the plasticizer may include phthalates, epoxides, aliphatic diesters, phosphates, sulfonamides, glycols, polyethers, trimellitates or chlorinated paraffin. In some embodiments, the plasticizer may be a diisooctyl phthalate, epoxidized soybean oil, di-2-ethylhexyl adipate, tricresyl phosphate, or trioctyl trimellitate.

Fillers are usually inert materials which may reinforce the composite or serve as an extender. Fillers therefore affect composite processing, storage, and curing. Fillers may also affect the properties of the composite such as electrical and heat insulting properties, modulus, tensile or tear strength, abrasion resistance and fatigue strength. In some embodiments, the fillers may include carbonates, metal oxides, clays, silicas, mica, metal sulfates, metal chromates, or carbon black. In some embodiments, the filler may include titanium dioxide, calcium carbonate, non-acidic clays, barium sulfate or fumed silica. The particle size of the filler may be engineered to optimize particle packing, providing a composite having reduced resin content. The engineered particle size may be a combination of fine, medium and coarse particles. The particle size may range from about 3 to about 74 microns.

Addition of adhesion promoters may improve adhesion to various substrates. In some embodiments, adhesion promoters may include modified phenolic resins, modified hydrocarbon resins, polysiloxanes, silanes, or primers.

Addition of rheological additives may control the flow behavior of the compound. In some embodiments, rheological additives may include fine particle size fillers, organic agents, or combinations of both. In some embodiments, rheological additives may include precipitated calcium carbonates, non-acidic clays, fumed silicas, or modified castor oils.

Composite Preparation

In one embodiment, the composite is formed by mixing the polymer, and optionally the diluent, with the initiators and additives. In some embodiments, appropriate solvents may also be included. Solvents that may be appropriate may comprise oil-based muds for use in downhole applications and may include mineral oil, biological oil, diesel oil, and synthetic oils.

Aging Temperature

In some embodiments, the curable polymer and the initiator may be reacted at a temperature ranging from about 25 to about 250° C.; from about 50 to about 150° C. in other embodiments; and from about 60 to about 100° C. in yet other embodiments. In other embodiments, the curable polymer and the initiator may be reacted at a temperature of about 65° C. However, one of ordinary skill in the art would appreciate that, in various embodiments, the reaction temperature may determine the amount of time required for composite formation.

Time Required for Composite Formation

Embodiments of the composites disclosed herein may be formed by mixing a curable polymer with an initiator. In some embodiments, a composite may form within about 3 hours of mixing the polymer and the initiator. In other embodiments, a composite may form between about 4 to about 6 hours of mixing the polymer and the initiator; between about 7 to about 9 hours of mixing in other embodiments.

The initiator upon aging at temperatures of about 80° F. to about 250° F. prompts the formation of free radicals in the polymers and/or diluent monomers. The radicals in turn cause the bond formation of the polymers and/or diluent monomers. The bonding changes the liquid composition into a hard composite.

The wellbore strengthening composition may also contain other common treatment fluid ingredients such as fluid loss control additives, dyes, anti-foaming agents when necessary, and the like, employed in typical quantities, known to those skilled in the art. Of course, the addition of such other additives should be avoided if it will detrimentally affect the basic desired properties of the treatment fluid.

EXAMPLES

Samples of F010 Vipel® Bisphenol A epoxy vinyl ester resins available from AOC Resins (Collierville, Tenn.), Barite (API grade barium sulfate), Crayvallac™ SL (or PC?) a polyamide based viscosifier available from Cook Composite and Polymers (Kansas City, Mo.), and benzoyl peroxide (40 wt % blend in dibutyl phthalate) from Sigma Aldrich (St. Louis, Mo.) were mixed in various proportions. Mixing was done at about room temperature. The Vipel® F010 contains styrene monomer to dilute the epoxy vinyl ester polymer.

TABLE 1

|  | Example | | |
|---|---|---|---|
|  | 1 | 2 | 3 |
| Vipel ® F010(g) | 100 | 50 | 50 |
| Barite (g) | 48 | 50 | 50 |
| Crayvallac ™ SL (g) | 2.8 | 0.8 | 0.8 |
| Benzoyl Peroxide (g) | 0.5 | 0.5 | 0..5 |
| Curing Temperature (° F.) | 150 | 150 | 150 |
| Curing Time (hour) | 3-4 | 3-4 | 3-4 |
| Result | Hard composite | Hard composite | Hard composite |

Samples of XR 3129 epoxy vinyl ester resins available from AOC Resins (Collierville, Tenn.), VeoVa™ 10 (vinyl ester of VERSATIC™ Acid 10 a synthetic saturated monocarboxylic acid with a highly branched structure containing ten carbon atoms) available from Hexion Specialty Chemicals (Columbus, Ohio) were mixed in various proportions with Trigonox K-90 cumyl hydroperoxide available from AkzoNobel (Norcross, Ga.). Mixing was done at room temperature and aging was done at a temperature of about 150° F.

TABLE 2

|  | Example | | | | |
|---|---|---|---|---|---|
|  | 4 | 5 | 6 | 7 | 8 |
| XR 3129 (g) | 40 | 30 | 50 | 50 | 50 |
| VeoVa ™ 10 (g) | 10 | 20 | 0 | 10 | 10 |
| Trigonox K-90 (g) | 0.5 | 0.5 | 0.5 | 0.5 | 0.5 |
| Curing Temperature (° F.) | 150 | 150 | 150 | 150 | 150 |
| Curing Time (hour) | 2-3 | 2-3 | 2-3 | 2-3 | 2-3 |
| Result | Hard composite | Hard composite | Hard composite | Hard composite | Hard composite |

Samples of XR 3129-L epoxy vinyl ester resins available from AOC Resins (Collierville, Tenn.), VeoVa™ 10 (vinyl ester of VERSATIC™ Acid 10 a synthetic saturated monocarboxylic acid with a highly branched structure containing ten carbon atoms) available from Hexion Specialty Chemicals (Columbus, Ohio), Arcosolv® TPNB (Tripropylene Glycol Normal Butyl Ether) available from LyondellBasell (Houston, Tex.), Barite (API grade barium sulfate), and Rheliant™ synthetic drilling mud (14 ppg) available from M-I LLC (Houston, Tex.) were mixed in various proportions with Trigonox K-90 cumyl hydroperoxide available from AkzoNobel (Norcross, Ga.). Mixing was done at room temperature and aging was done at a temperature of about 150° F.

TABLE 3

|  | Example | | | | |
|---|---|---|---|---|---|
|  | 9 | 10 | 11 | 12 | 13 |
| XR 3129-L (g) | 45 | 40 | 42.5 | 42.5 | 42.5 |
| VeoVa ™ 10 (g) | 5 | 10 | 5 | 5 | 5 |
| Arcosolv ® TPNB (g) | 0 | 0 | 2.5 | 2.5 | 2.5 |
| Barite (g) | 50 | 50 | 50 | 50 | 50 |
| Rheliant Mud (g) | 65 | 65 | 65 | 65 | 65 |
| Trigonox K-90 (g) | 1 | 1 | 1 | 1 | 1 |
| Curing Temperature (° F.) | 150 | 150 | 150 | 150 | 150 |
| Curing Time (hour) | 2-3 | 2-3 | 2-3 | 2-3 | 2-3 |
| Result | Hard composite | Hard composite | Hard composite | Hard composite | Hard composite |

Samples of XR 3146 epoxy vinyl ester resins available from AOC Resins (Collierville, Tenn.), Barite (API grade barium sulfate), Crayvallac™ SL (or PC?) a polyamide based viscosifier available from Cook Composite and Polymers (Kansas City, Mo.), and benzoyl peroxide (40 wt % blend in dibutyl phthalate) from Sigma Aldrich (St. Louis, Mo.) were mixed in various proportions. Mixing was done at room temperature and aging was done at a temperature of about 150° F.

TABLE 4

|  | Example | |
|---|---|---|
|  | 14 | 15 |
| XR 3146 (g) | 50 | 50 |
| Barite (g) | 50 | 50 |
| Crayvallac ™ SL (g) | 0 | 0.8 |
| Benzoyl Peroxide (g) | 0.5 | 0.5 |
| Curing Temperature (° F.) | 150 | 150 |
| Curing Time (hour) | 3-4 | 3-4 |
| Result | Hard composite | Hard composite |

Samples of XR 3146 epoxy vinyl ester resins available from AOC Resins (Collierville, Tenn.), Barite (API grade barium sulfate), Crayvallac™ SL (or PC?) a polyamide based viscosifier available from Cook Composite and Polymers (Kansas City, Mo.), benzoyl peroxide (40 wt % blend in dibutyl phthalate) from Sigma Aldrich (St. Louis, Mo.), and Rheliant™ synthetic drilling mud (14 ppg) available from M-I LLC (Houston, Tex.) were mixed in various proportions. Mixing was done at room temperature and aging was done at a temperature of about 150° F.

TABLE 5

|  | Example | | |
|---|---|---|---|
|  | 16 | 17 | 18 |
| XR 3146 (g) | 50 | 50 | 50 |
| Barite (g) | 50 | 50 | 50 |
| Crayvallac SL (g) | 0 | 0.8 | 0.8 |

TABLE 5-continued

| | Example | | |
|---|---|---|---|
| | 16 | 17 | 18 |
| Benzoyl Peroxide (g) | 0.5 | 0.5 | 0.5 |
| Rheliant Mud (ml) | 6 | 15 | 20 |
| % mud by volume | 10 | 25 | 32 |
| Curing Temperature (° F.) | 150 | 150 | 150 |
| Curing Time (hour) | 3-4 | 3-4 | 3-4 |
| Result | Hard composite | Hard composite | Hard composite |

Samples of XR 3146 epoxy vinyl ester resins available from AOC Resins (Collierville, Tenn.), Barite (EMI 1012 UF barium sulfate) available from M-I LLC (Houston, Tex.), benzoyl peroxide (40 wt % blend in dibuty phthalate) from Sigma Aldrich (St. Louis, Mo.), and Rheliant™ synthetic drilling mud (14 ppg) available from M-I LLC (Houston, Tex.) were mixed in various proportions. Mixing was done at room temperature and aging was done at a temperature of about 150° F.

TABLE 6

| | Example | | | |
|---|---|---|---|---|
| | 19 | 20 | 21 | 22 |
| XR 3146 (g) | 50 | 50 | 50 | 50 |
| Barite (g) | 24 | 24 | 24 | 0 |
| Benzoyl Peroxide (g) | 0.35 | 0.5 | 1.25 | 1 |
| Rheliant Mud (g) | 0 | 24 | 24 | 0 |
| Curing Temperature (° F.) | 150 | 150 | 150 | 150 |
| Curing Time (hour) | 3-4 | 3-4 | 3-4 | 3-4 |
| Result | Hard composite | Hard composite | Hard composite | Hard composite |

Samples of XR 3191 epoxy vinyl ester resins available from AOC Resins (Collierville, Tenn.), Barite (EMI 1012 UF barium sulfate) available from M-I LLC (Houston, Tex.), benzoyl peroxide (40 wt % blend in dibutyl phthalate) from Sigma Aldrich (St. Louis, Mo.), and Rheliant™ synthetic drilling mud (14 ppg) available from M-I LLC (Houston, Tex.) were mixed in various proportions. Mixing was done at room temperature and aging was done at a temperature of about 150° F.

TABLE 7

| | Example | |
|---|---|---|
| | 19 | 20 |
| XR 3191 (g) | 50 | 50 |
| Barite (g) | 24 | 24 |
| Benzoyl Peroxide (g) | 0.75 | 0.75 |
| Rheliant Mud (g) | 8.65 | 26 |
| % mud by volume | 10 | 30 |
| Curing Temperature (° F.) | 150 | 150 |
| Curing Time (hour) | 2-3 | 2-3 |
| Result | Hard composite | Hard composite |

Samples of XR 3191 epoxy vinyl ester resins available from AOC Resins (Collierville, Tenn.), Barite (EMI 1012 UF barium sulfate) available from M-I LLC (Houston, Tex.), benzoyl peroxide (40 wt % blend in dibutyl phthalate) from Sigma Aldrich (St. Louis, Mo.), and Rheliant™ synthetic drilling mud (11.31 ppg) available from M-I LLC (Houston, Tex.) were mixed in various proportions. Mixing was done at room temperature and aging was done at a temperature of about 150° F.

TABLE 8

| | Example | | |
|---|---|---|---|
| | 21 | 22 | 23 |
| XR 3191 (g) | 200 | 200 | 200 |
| Barite (g) | 132 | 132 | 132 |
| Benzoyl Peroxide (g) | 0.86 | 0.96 | 0.96 |
| Rheliant Mud (g) | 0 | 30 | 60 |
| Curing Temperature (° F.) | 150 | 150 | 150 |
| Curing Time (hour) | 4-6 | 4-6 | 4-6 |
| Result | Hard composite | Hard composite | Hard composite |
| Unconfined Compressive Strength (psi) | 7140 | 1980 | 566 |

The XR series of epoxy vinyl ester resins do not contain styrene as a diluent, thereby reducing the toxicity of the composition. Compositions made with XR 3129 produced a higher viscosity product than those compositions made with XR 3129L, XR 3146, or XR 3191. XR 3146 provides a composition with high unconfined compressive strength. XR 3191 provides for using various concentrations of activator while still providing a composition having good strength.

Samples of A057-BBB-000 epoxy vinyl ester/urethane acrylate resins available from AOC Resins (Collierville, Tenn.), HiSil™ 532 EP (silica powder) available from PPG Industries (Monroeville, Pa.), Barite (1012 UF barium sulfate) available from M-I LLC (Houston, Tex.), PBQ (para-benzoquinone solution 50 mg in 2 g), Trigonox 42 S tert-butyl peroxy-3,5,5-trimethyhexanoate available from AkzoNobel (Norcross, Ga.), benzoyl peroxide (40 wt % blend in dibuty phthalate) from Sigma Aldrich (St. Louis, Mo.), Rheliant™ synthetic drilling mud (12 ppg) available from M-I LLC (Houston, Tex.), and Cement H (as a cement contaminant) were mixed in various proportions. Mixing was done at room temperature and aging was done at a temperature of about 150° F. A time versus temperature graph for Examples 24 and 24 is shown in FIG. 1.

TABLE 9

| | Example | |
|---|---|---|
| | 24 | 25 |
| A057-BBB-000 (g) | 200 | 200 |
| HiSil ™ 532 EP (g) | 4 | 4 |
| Barite (g) | 148 | 148 |
| PBQ (g) | 4 | 4 |
| Trigonox 42 S (g) | 0.28 | 0.28 |
| Benzoyl Peroxide (g) | 1.8 | 1.8 |
| Rheliant Mud (g) | 3.7 | 3.7 |
| Cement H (g) | 0 | 36 |
| Curing Temperature (° F.) | 150 | 150 |
| Result | Hard composite | Hard composite |

Samples of A057-BBB-000 epoxy vinyl ester/urethane acrylate resins available from AOC Resins (Collierville, Tenn.), HiSil™ 532 EP (silica powder) available from PPG Industries (Monroeville, Pa.,), Barite (EMI 1012 UF barium sulfate) available from M-I LLC (Houston, Tex.), PBQ (2% parabenzoquinone solution in diproylene glycol methyl ether), Trigonox 42 S tert-butyl peroxy-3,5,5-trimethyhexanoate available from AkzoNobel (Norcross, Ga.), benzoyl peroxide (40 wt % blend in dibutyl phthalate) from Sigma Aldrich (St. Louis, Mo.), were mixed in various proportions. Mixing was done at room temperature and aging was done at a temperature of about 170° F.

TABLE 10

| | Example | |
|---|---|---|
| | 26 | 27 |
| A057-BBB-000 (g) | 300 | 150 |
| HiSil ™ 532 EP (g) | 4.5 | 10 |
| Barite (g) | 251.58 | 17.25 |
| PBQ (g) | 6 | 1.25 |
| Trigonox 42 S (g) | 0.42 | 0.25 |
| Benzoyl Peroxide (g) | 2.7 | 1.4 |
| Curing Temperature (° F.) | 170 | 170 |
| Result | Hard composite | Hard composite |
| Time of composite formation (hours) | 4-6 | 6-8 |
| Weight of formulation (ppg) | 12.5 | 9 |

A sample of A057-BBB-000 epoxy vinyl ester/urethane acrylate resins available from AOC Resins (Collierville, Tenn.), HiSil™ 532 EP (silica powder) available from PPG Industries (Monroeville, Pa.), Barite (1012 UF barium sulfate) available from M-I LLC (Houston, Tex., PBQ (2% parabenzoquinone solution in diproylene glycol methyl ether), Trigonox 42 S tert-butyl peroxy-3,5,5-trimethyhexanoate available from AkzoNobel (Norcross, Ga.), Rheliant™ synthetic drilling mud (12 ppg) available from M-I LLC (Houston, Tex.) (to show effect of drilling fluid contamination), benzoyl peroxide (40 wt % blend in dibutyl phthalate) from Sigma Aldrich (St. Louis, Mo.) and an activator were mixed in various proportions. Mixing was done at room temperature and aging was done at a temperature of about 150° F.

TABLE 11

| | Example 28 |
|---|---|
| A057-BBB-000 (g) | 500 |
| HiSil ™ 532 EP (g) | 10 |
| Barite (g) | 370 |
| PBQ (g) | 10 |
| Trigonox 42 S (g) | 0.68 |
| Benzoyl Peroxide (g) | 4.5 |
| Rheliant Mud (g) | 9.25 |
| Activator | 0.5% |
| Curing Temperature (° F.) | 150 |
| Result | Hard composite |

Figure 2:
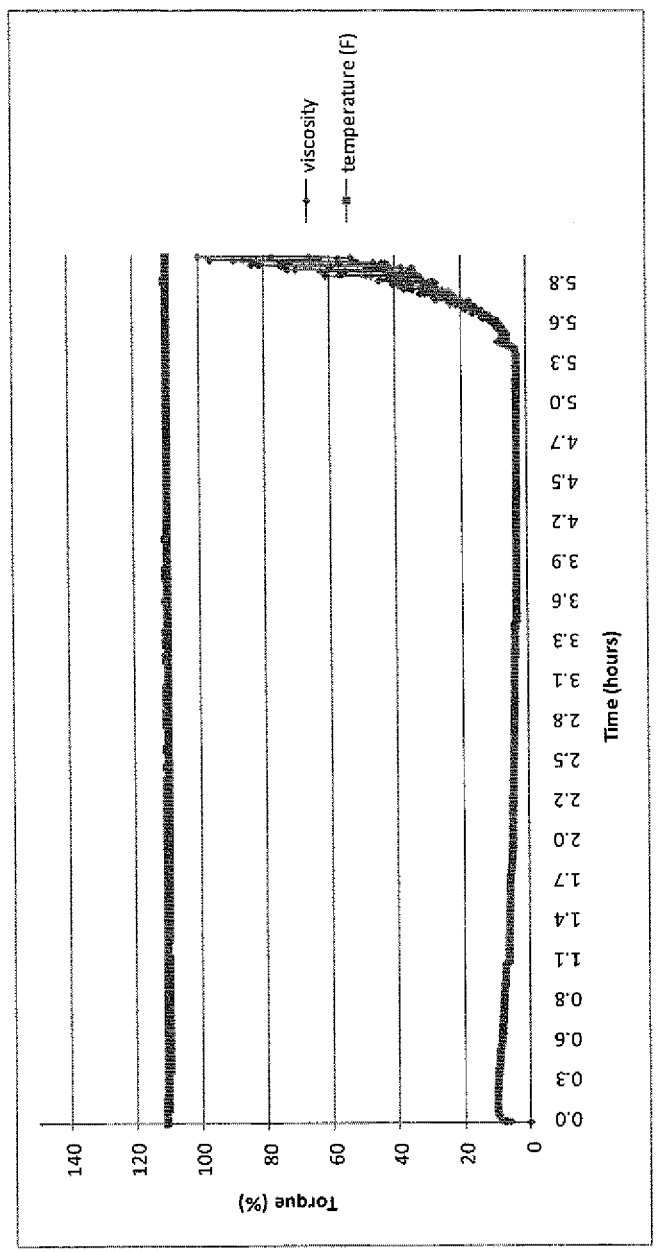
FIG. 2 graphically compares torque and curing times for wellbore strengthening compositions according to embodiments disclosed herein.

A sample of A057-BBB-000 epoxy vinyl ester/urethane acrylate resins available from AOC Resins (Collierville, Tenn.), HiSil™ 532 EP (silica powder) available from PPG Industries (Monroeville, Pa.), Barite (1012 UF barium sulfate) available from M-I LLC (Houston, Tex.), Biscomer PTE (5% N,N-Bis-(2-hydroxyethyl)-Para-toluidine solution) available from Cognis (Monheim, Germany), Trigonox 42 S tert-butyl peroxy-3,5,5-trimethyhexanoate available from AkzoNobel (Norcross, Ga.), Rheliant™ synthetic drilling mud (9 ppg) available from M-I LLC (Houston, Tex.) (as a drilling fluid contaminant), benzoyl peroxide (40 wt % blend in dibutyl phthalate) from Sigma Aldrich (St. Louis, Mo.), were mixed in various proportions, as shown in Table 12. Mixing was done at room temperature and aging was done at a temperature of about 112° F. FIG. 2 shows the setting of the composite 29 with time.

TABLE 12

| | Example 29 |
|---|---|
| A057-BBB-000 (g) | 200 |
| HiSil ™ 532 EP (g) | 8 |
| Barite (g) | 23 |
| Biscomer PTE (g) | 0.25 |
| Trigonox 42 S (g) | 2 |
| Benzoyl Peroxide (g) | 2.5 |
| Rheliant Mud (g) | 2.4 |
| Curing Temperature (° F.) | 112 |
| Result | Hard composite |

Figure 3:
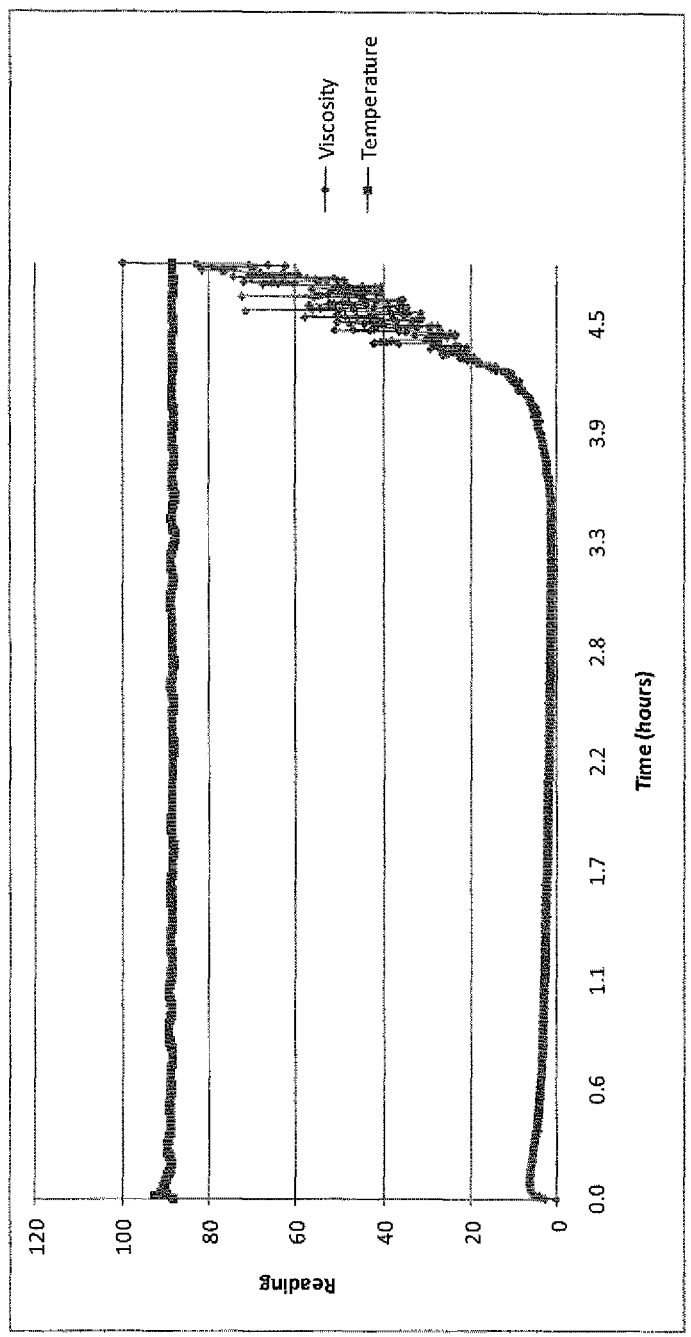
FIG. 3 graphically compares torque and curing times for wellbore strengthening compositions according to embodiments disclosed herein.

A sample of A057-BBB-000 epoxy vinyl ester/urethane acrylate resins available from AOC Resins (Collierville, Tenn.), HiSil™ 532 EP (silica powder) available from PPG Industries (Monroeville, Pa.), Barite (1012 UF barium sulfate) available from M-I LLC (Houston, Tex.), Cobalt 2-Ethylhexonate (12% solution), Biscomer PTE (5% N,N-Bis-(2-hydroxyethyl)-Para-toluidine solution) available from Cognis (Monheim, Germany), Trigonox 42 S tert-butyl peroxy-3,5,5-trimethyhexanoate available from AkzoNobel (Norcross, Ga.), Rheliant™ synthetic drilling mud (9 ppg) available from M-I LLC (Houston, Tex.), benzoyl peroxide (40 wt % blend in dibutyl phthalate) from Sigma Aldrich (St. Louis, Mo.), and an activator were mixed in various proportions. Mixing was done at room temperature and aging was done at a temperature of about 90° F. FIG. 3 shows the setting of the composite 30 with time.

TABLE 13

| | Example 30 |
|---|---|
| A057-BBB-000 (g) | 100 |
| HiSil ™ 532 EP (g) | 4 |
| Barite (g) | 11.5 |
| Cobalt-2 Ethylhexonate (g) | 0.15 |
| Biscomer PTE (g) | 0.25 |
| Trigonox 42 S (g) | 1 |
| Benzoyl Peroxide (g) | 1.25 |
| Rheliant Mud (g) | 1.2 |
| Activator | 1.5% |
| Curing Temperature (° F.) | 90 |
| Result | Hard composite |

Applications

Some embodiments of the composites disclosed herein may be formed in a one-solution single component system, where the initiator is premixed with the curable polymers, and the mixture may then be placed or injected prior to cure. The cure times may be adjusted by changing the quantity of diluent (or other solvent) in the solution. The cure times may also be adjusted by changing the initiator and/or concentration of the initiator. Other embodiments of the composites disclosed herein may also be formed in a two-component system, where the initiators and curable polymers may be mixed separately and combined immediately prior to injection. Alternatively, one reagent, the polymers or initiator, may be placed in the wellbore or the near-wellbore region where it may then be contacted by the other reagent, either the polymers or initiator as required.

According to one embodiment of the present invention, at least a portion of the annular region between the metal casing in the borehole and the sidewall of the formation drilled may include a layer of solidified wellbore fluid. The solidified wellbore fluid may be formed by allowing a wellbore fluid including a curable polymer and at least one initiator, both of which are described above, to set within the annular space.

According to one embodiment of the present invention, a subterranean zone may be sealed by preparing a wellbore fluid that includes a curable polymer and at least one initiator, both of which are described above. The wellbore fluid may be placed in at least a portion of the annular space between the sidewalls of a wellbore and the exterior of a casing string disposed in the wellbore. The wellbore fluid may then be allowed to solidify therein. In some embodiments, a cement slurry may also be placed in at least a portion of the annular space between the sidewalls of the wellbore and the exterior of the casing string. The cement slurry may be placed in the annular space either with, before, or after the wellbore fluid is placed in the annular space. In other embodiments, at least a portion of the annular space is occupied with a pre-solidified or partially solidified cement barrier prior to the treated wellbore fluid being placed in the annular space. In some embodiments, the pumping of the wellbore fluid and the cement slurry occurs by pumping the wellbore fluid and the cement slurry through the casing string to fill the annular space.

Advantages of the current disclosure may include a composite with excellent ability to vary the composite properties based on a variety of applications. Polymers of the present disclosure display an exceptionally wide range of chemistries and physical properties. As such, the polymer may be selected to tailor the properties of the resultant composite. Adjustable curing times, temperatures, and physical properties of the resulting composite may be selected for a particular desired application. For example, the composite may be chosen to an appropriate hardness, or flexural or elastic moduli. Additionally, polymer systems tend to be exhibit exceptional bond strength and low toxicity and volatility.

While the present disclosure has been described with respect to a limited number of embodiments, those skilled in the art, having benefit of this disclosure, will appreciate that other embodiments may be devised which do not depart from the scope of the present disclosure. Accordingly, the scope of the present disclosure should be limited only by the attached claims.

What is claimed is:

1. A composition comprising:
   at least one polymer capable of polymerizing through a free radical polymerization reaction from the group of epoxy acrylates, modified epoxy acrylates, epoxy precursors, modified epoxy vinyl esters, unsaturated polyesters, urethane (meth)acrylates, polyester acrylates, and epoxy vinyl ester resins having repeating units with the formula:

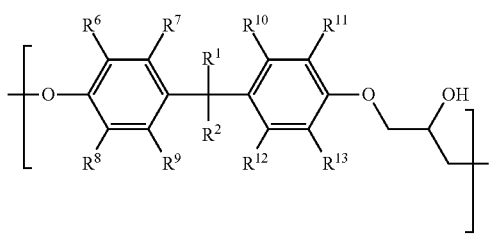

wherein R1-R1 are CH3- or H and R6-R13 are H or Br, and polymer combinations thereof; at least one initiator;
at least one non-aqueous solvent selected from the group of mineral oil and diesel oil; and
at least one monomer selected from the group of vinyl ester monomers,
wherein the at least one polymer is present in the amount from about 10 to about 90 weight percent,
wherein modified means hybrid polymers or polymers that are extended with other molecules that are not bisphenol derivatives.

2. The composition of claim 1, wherein the monomers are from the group of monofunctional, multifunctional, hydroxyl functionalized, amine functionalized, carboxylic acid functional, polyether polyol extended, and combinations thereof.

3. The composition of claim 1, wherein the vinyl ester monomers are esters of versatic acid.

4. The composition of claim 1 further comprising at least one weighting agent.

5. The composition of claim 1 further comprising at least one drilling fluid.

6. The composition of claim 1 further comprising at least one inhibitor.

7. The composition of claim 1 wherein the initiator is selected from the group consisting of a free radical initiating catalyst, azo compounds, alkyl or acyl peroxides or hydroperoxides, dialkyl peroxides, ketoperoxides, peroxy esters, peroxy carbonates, peroxy ketals, and combinations thereof.

8. The composition of claim 7, wherein the free radical initiating catalyst is selected from the group consisting of benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, t-butyl peracetate, and combinations thereof.

9. The composition of claim 1, wherein the at least one polymer is a mixture of epoxy vinyl ester resins having repeating units with the formula:

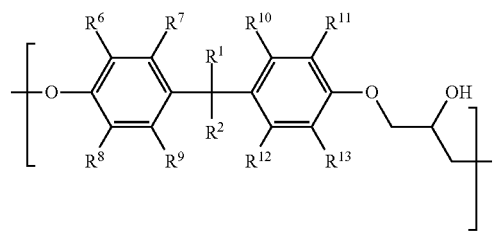

wherein $R^1$-$R^2$ are $CH_3$— or H and $R^6$-$R^{13}$ are H or Br, and a urethane (meth)acrylate having the formula:
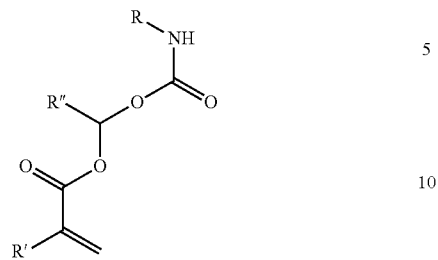
wherein R is a $C_6$ to $C_{28}$ aliphatic or aromatic, R' or R" is hydrogen or methyl.
* * * * *